United States Patent
Tsubouchi et al.

(10) Patent No.: US 6,297,794 B1
(45) Date of Patent: Oct. 2, 2001

(54) METHOD OF SWITCHING VIDEO SOURCES AND COMPUTER SYSTEM EMPLOYING THIS METHOD

(75) Inventors: Takumi Tsubouchi, Hidaka; Nobutaka Nishigaki, Fussa; Makoto Sakai, Ome; Toru Honma, Tokyo, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/091,183

(22) PCT Filed: Oct. 2, 1997

(86) PCT No.: PCT/JP97/03516

§ 371 Date: Jun. 10, 1998

§ 102(e) Date: Jun. 10, 1998

(87) PCT Pub. No.: WO98/16887

PCT Pub. Date: Apr. 23, 1998

(30) Foreign Application Priority Data

Oct. 11, 1996 (JP) .................................................. 8-269895

(51) Int. Cl.⁷ ...................................................... G09G 5/00

(52) U.S. Cl. ........................... 345/112; 345/501; 345/507

(58) Field of Search ................................... 345/112, 501, 345/507

(56) References Cited

U.S. PATENT DOCUMENTS

| | | | |
|---|---|---|---|
| 5,321,750 | * 6/1994 | Nadan | 380/20 |
| 5,434,590 | * 7/1995 | Dinwiddie, Jr. et al. | 345/115 |
| 5,506,832 | 4/1996 | Arshi et al. | |
| 5,506,954 | 4/1996 | Arshi et al. | |
| 5,568,192 | 10/1996 | Hannah . | |

FOREIGN PATENT DOCUMENTS

| | | |
|---|---|---|
| 58-125124 | 7/1983 | (JP) . |
| 59-719 | 1/1984 | (JP) . |
| 59-167730 | 9/1984 | (JP) . |
| 63-223853 | 9/1988 | (JP) . |
| 1-293418 | 11/1989 | (JP) . |
| 4-284577 | 10/1992 | (JP) . |
| 4-295947 | 10/1992 | (JP) . |
| 5-210481 | 8/1993 | (JP) . |
| 6-83695 | 3/1994 | (JP) . |
| 6-250827 | 9/1994 | (JP) . |
| 7-262130 | 10/1995 | (JP) . |
| 7-284077 | 10/1995 | (JP) . |
| 7-334456 | 12/1995 | (JP) . |
| 7-334647 | 12/1995 | (JP) . |
| 8-234931 | 9/1996 | (JP) . |

OTHER PUBLICATIONS

A. Kinoshita et al., "Re–borning notebook computer", Nikkei Baito, No. 148, p. 149–153 (1996).

J. Nakata, "Study on Hardware of PC/AT Compatable Machine Study on Hardware of Video Adapter", Semiconductor Technique, 32(3):285–288 (1995.

* cited by examiner

Primary Examiner—Jeffery Brier
Assistant Examiner—Motilewa Good-Johnson
(74) Attorney, Agent, or Firm—Finnegan, Henderson, Farabow, Garrett & Dunner, L.L.P.

(57) ABSTRACT

A plurality of video devices, that is, a PC card controller 17, an MPEG2 decoder 18, a P1394 controller 20, and a video capture 31 have each a motion-picture output port connected to a video/audio dedicated bus 4, as well as an interface with a PCI bus 2. Hence, any motion-picture source can be transferred directly to a display controller 14 through the video/audio dedicated bus, without using the PCI bus 2. Various motion-picture sources can therefore be efficiently displayed.

11 Claims, 14 Drawing Sheets

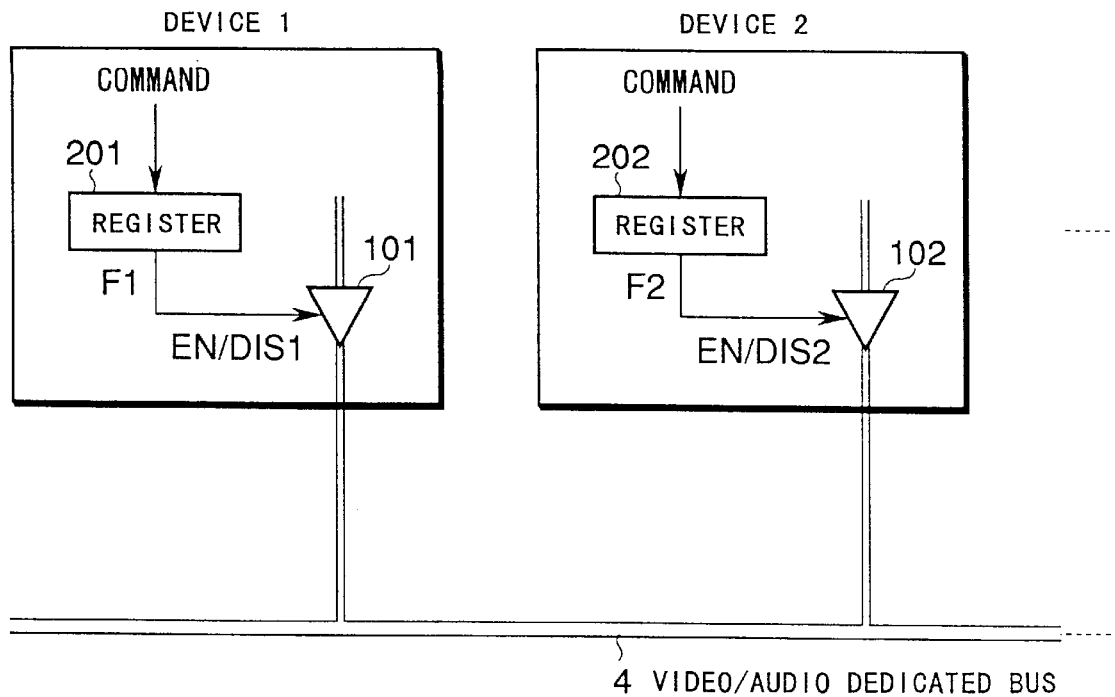
FIG.4
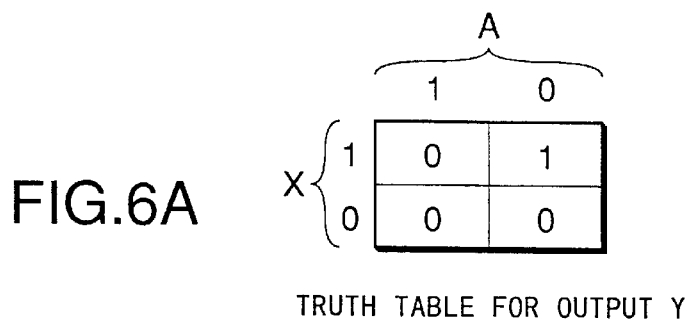
TRUTH TABLE FOR OUTPUT Y
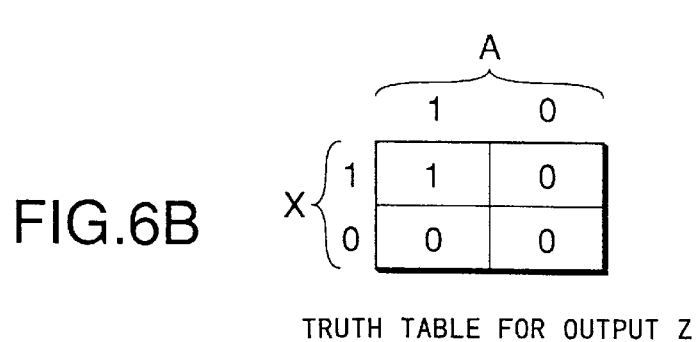
TRUTH TABLE FOR OUTPUT Z

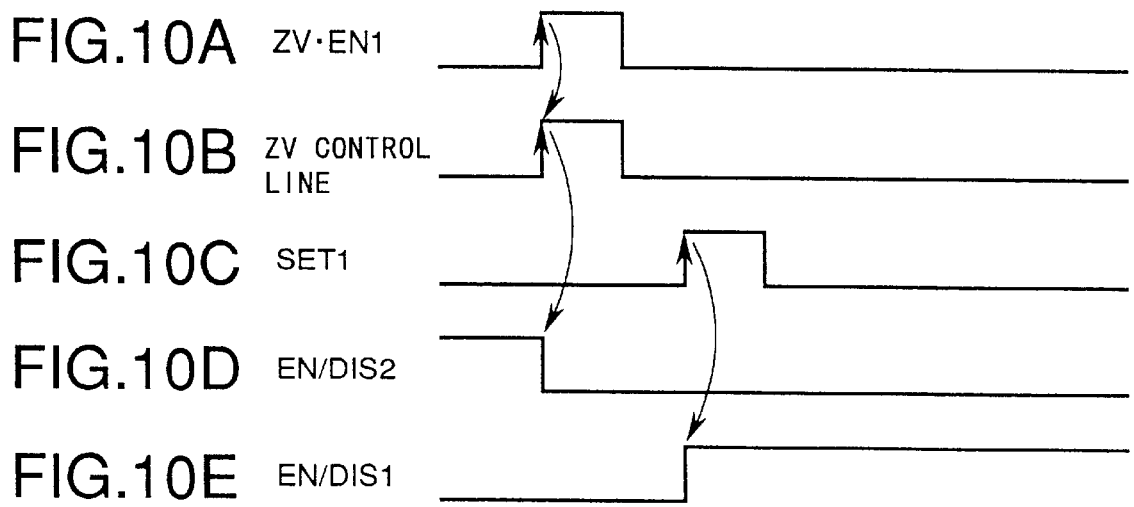
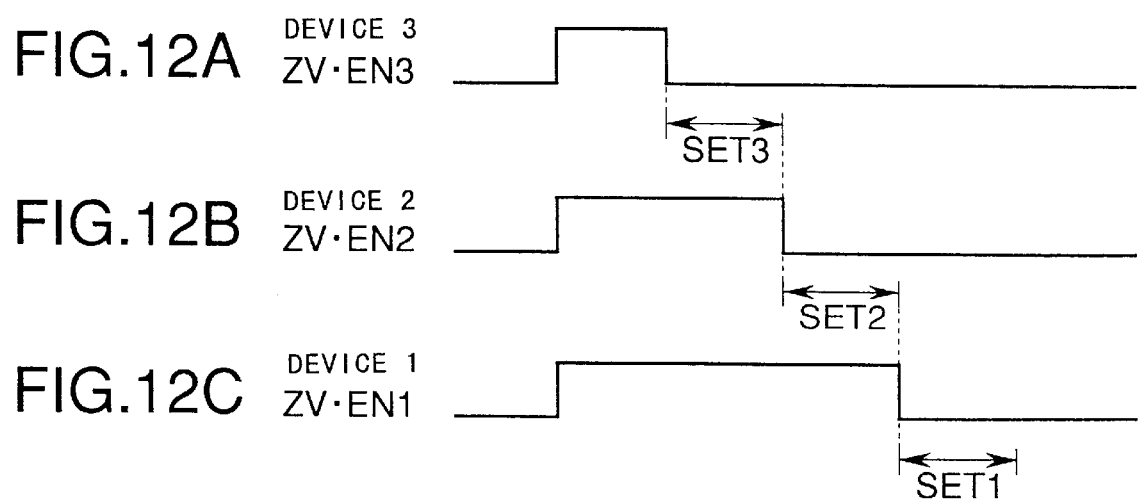

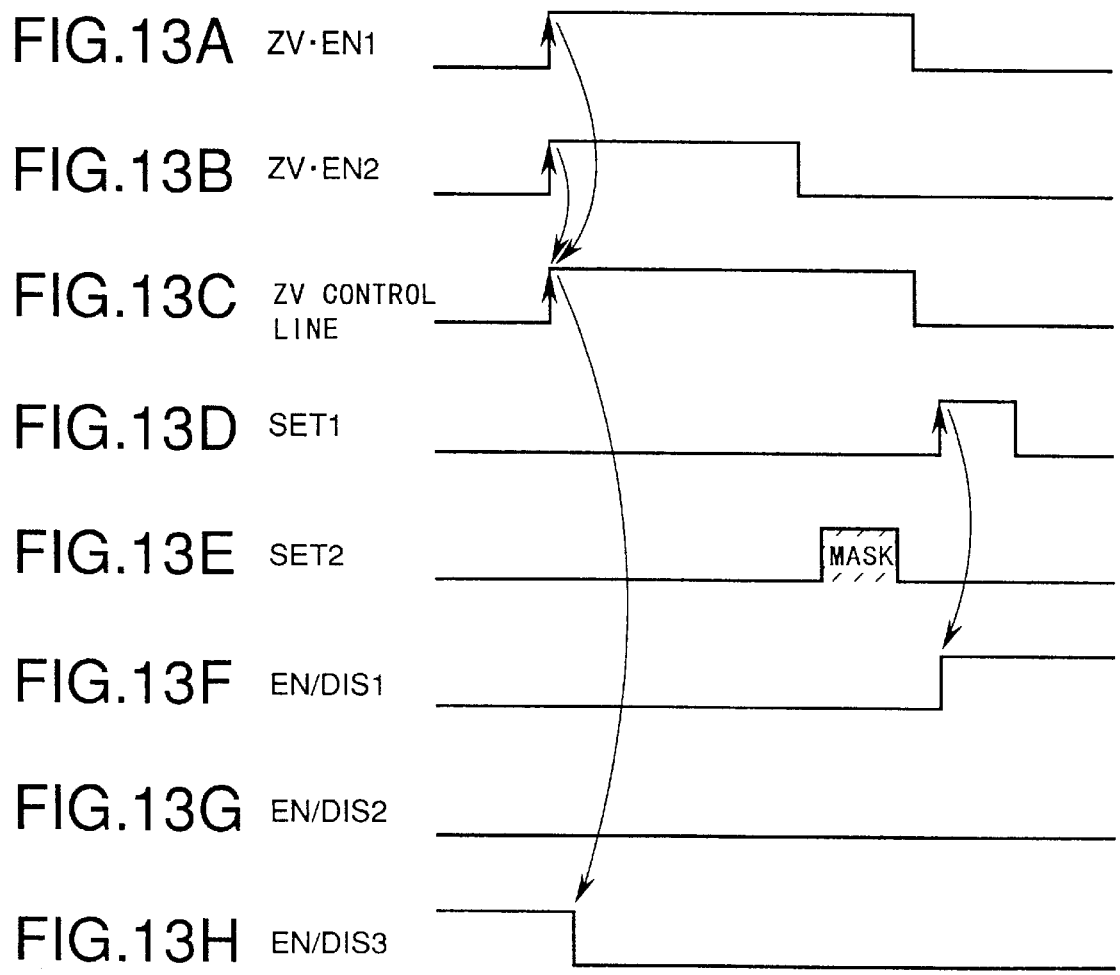

METHOD OF SWITCHING VIDEO SOURCES AND COMPUTER SYSTEM EMPLOYING THIS METHOD

TECHNICAL FIELD

The present invention relates to a computer system having a ZV (Zoomed Video) port and also to a method of switching video sources to be transferred by using a ZV port.

BACKGROUND ART

In recent years, notebook-type personal computers have been used in increasing numbers, each having a PC card socket which accords with the standards of PCMCIA (Personal Computer Memory Card International Association), an American association, and with the standards of JEIDA. Various techniques have been developed to use this PC card as a video capture card or an MPEG decoder card, for controlling the input and output of motion-picture data.

System architecture having a PCI local bus is now used increasingly in order to process a great amount of data, such as motion-picture data, with high efficiency. This is because the PCI local bus can transfer data at high speed.

If the PCI local bus is used, however, its data-transferring ability is limited. The data-transferring ability of the PCI local bus is insufficient when the PC card is used as a video capture card or an MPEG decoder card as is mentioned above.

Recently, a technique has been developed. The technique is to connect a PC card and a display controller directly, by a so-called ZV (Zoomed Video) port, which is a bus designed exclusively for transferring motion-picture data. The ZV port enables the PC card to output video/audio data directly to the display controller/audio controller, without using the system bus. This solves the problem that the system bus is occupied for a long time to transfer a great amount of video data, thereby enhancing the video-data processing ability of the system.

Recently, multimedia techniques have advanced also in the field of personal computers. Various devices other than PC cards, which handle motion-picture data, are now incorporated in the system. These devices will be exemplified as follows:

(1) Video capture: Converting analog video signals from an imaging device such as a video camera to digital data, and inputting the digital data.

(2) MPEG decoder: Expanding motion-picture data compressed by MPEG, thus generating live motion-picture data.

(3) High-speed serial interface, e.g. IEEE1394: Inputting motion-picture data transferred from a digital video camera, a digital video player, and the like.

These devices are connected to the system bus in most cases. Therefore, the motion-picture data output from these devices will be transferred to the display controller through the system bus.

(1) Usually, the system bus has a bandwidth large enough to transfer motion-picture data. The rate of transferring motion-picture data must therefore be lowered in order to transfer motion-picture data through the system bus. If the transfer rate is lowered, the resolution of the motion picture will decrease, the frame rate thereof will decrease, or the number of bits per pixel will decrease. Consequently, the motion picture will be deteriorated in quality.

(2) The motion-picture data transfer mostly occupies the bandwidth of the system bus. The operations other than the motion-picture transfer via the system bus, for example the data transfer between the device and a disk drive will become slow. Further, the device may not normally operate, failing to transfer data in real-time fashion. If a communication device such as a modem does not operate normally, for example, a part of data may not be transmitted.

DISCLOSURE OF INVENTION

The present invention has been made in view of the foregoing. Its object is to provide a computer system in which a plurality of video sources can be transferred directly to the display controller, without using the system bus, from a plurality of devices which process motion-picture data, so that the various video sources can be displayed with high efficiency, and also to provide a method of switching video sources in the system.

The present invention is a computer system having a display controller having a video port for receiving motion-picture data and capable of displaying the motion-picture data input to the video port, and a motion-picture data bus provided for transferring exclusively the motion-picture data to the video port of the display controller. The computer system is characterized by comprising a plurality of video devices and switching means. The video devices process different motion-picture sources, each having an output port connected to the motion-picture data bus and designed to output motion-picture data from the output port to the motion-picture data bus. The switching means switches the video devices, thereby selecting one video device which is to transfer motion-picture data to the display controller through the motion-picture data bus.

In the computer system, the video devices, such as a video capture, an MPEG decoder, and an IEEE1394 serial interface, are connected to a video/audio dedicated bus provided for transferring motion-picture data directly to the video port (ZV port) of the display controller, without using the system bus. Thus, one and the same video/audio dedicated bus is used to transfer motion-picture data from whichever video device. Therefore, whichever video source can be transferred to the display controller, without using the system bus. The various video sources can be transferred with high efficiency. Furthermore, the computer system has switching means for switching the video devices which use the video/audio dedicated bus. The switching means operates such that motion-picture data is transferred to the display controller from only one device at a time. This makes it possible for the single video/audio dedicated bus to connect the devices to the display controller in a point-to-point fashion. Data collision on the video/audio dedicated bus can thereby be prevented.

The means for switching the video devices, thus enabling one device at a time to use the video/audio dedicated bus, preferably has one of the following alternative structures:

(1) Each video device has an output buffer for outputting motion-picture data from the output port to the video/audio dedicated bus. Each video device also has means for enabling or disabling the output buffer to output the data, in accordance with an instruction supplied from the CPU of the computer system.

Each video device therefore outputs motion-picture data to the video/audio dedicated bus only when the CPU issues a motion-picture data transfer instruction or the like. Software executed by the CPU enables the output buffer of only one video device, at a time, to output data. Data collision on the video/audio dedicated bus can therefore be prevented easily.

(2) The video devices are connected to the video/audio dedicated bus, forming a daisy chain. A control signal line is added for transferring an enable signal which allows each video device to use the video/audio dedicated bus, to the video devices, one after another, first from the video device which located at the head of the daisy chain.

Each video device has an output buffer for outputting motion-picture data from the output port to the video/audio dedicated bus. Each video device also has means for enabling or disabling the output buffer to output the data, in accordance with an instruction supplied from the CPU of the computer system and the enable signal transferred through the control signal line. The means inhibits the transfer of the enable signal to the next video device when the output buffer is enabled to output the motion-picture data.

In this structure, any video device has priority over the video device located downstream of the daisy chain, with regard to the use of the video/audio dedicated bus. No enable signal is transferred to the video device located downstream of the daisy chain before the audio device enabled to use the video/audio dedicated bus finishes using the video/audio dedicated bus. Thus, automatic control is achieved that the output buffer of only one device is allowed, at a time, to output data. Software control is unnecessary to allow, at a time, the output buffer of only one device to output data.

(3) A plurality of video devices are connected to the video/audio dedicated bus. A control signal line is added which is set into an active state by any video device which is requesting for the use of the video/audio dedicated bus.

Each video device has an output buffer for outputting motion-picture data from the output port to the video/audio dedicated bus. Each video device also has two means. The first means sets the control signal line in the active state for a prescribed period, in accordance with a motion-picture data transfer instruction issued from the CPU of the computer system, and allows the output buffer to output motion-picture data upon lapse of the prescribed period. The second means monitors the state the control signal line assumes, and prohibits the output buffer from outputting motion-picture data, as long as the control signal remains active.

In this structure, the video device, which has last set the control signal line into the active state gains priority over any other video device with regard to the use of the video/audio, dedicated bus. Therefore, priority can be equally assigned to any device at the initial stage of operation.

(4) A means which can use the video/audio-dedicated bus is added to the structure described in the paragraph (3). The means monitors the status the control signal line takes. When a motion-picture data transfer instruction is issued while the control signal remains active, the means sustains an operation of setting the control signal line into an active state until the control signal line is released from the active state. The video device, which has last received a motion-picture data transfer instruction from the CPU, is allowed to use the video/audio-dedicated bus.

(5) In the structure specified in the paragraph (3), the period for which the control signal line remains in the active state in accordance with a motion-picture data transfer instruction supplied from the CPU is different for each video device. The structure specified in the paragraph (4) may be added to this structure. If so, any device having a small pulse width can have priority with regard to the use of the video/audio dedicated bus, even if it receives a motion-picture data transfer instruction after any other device that has a great pulse width.

(6) Software executes the following sequence of operations. First, the states in which the video devices use the video/audio-dedicated bus are managed. In response to a request for the video/audio-dedicated bus, supplied from a driver program which controls the video devices, it is determined which video device is using the video/audio-dedicated bus. Next, communication is performed with the video device now using the video/audio-dedicated bus, thereby determining whether or not the video device can release the video/audio dedicated bus. If it is found that the device can release the bus, use permission is supplied to the. driver program which has issued the request for the video/audio dedicated bus request.

In this sequence of operations, the states in which the video devices use the video/audio-dedicated bus are managed under the control of software. Communication is effected between the software and the driver programs which control the video devices, thereby switching one device for another. Hence, motion-picture data is transferred to the display controller from only one device at a time.

BRIEF DESCRIPTION OF DRAWINGS

FIG. 4 is a diagram illustrating the internal structures of devices which are switched in a first switching control mode to be connected to the video/audio dedicated bus in the system.

FIGS. 6A and 6B are diagrams representing the input-output relations of the combinatorial logic circuits shown in FIG. 5.

FIGS. 10A to 10E are a timing chart explaining the operation of the combinatorial logic circuits shown in FIG. 8.

FIGS. 12A to 12C are a chart explaining how the programmable pulse generating circuit provided in each combinatorial logic circuit shown in FIG. 11 generates pulses having a width specific for the device incorporating the logic circuit.

FIGS. 13A to 13H are a timing chart explaining the operation of the combinatorial logic circuits shown in FIG. 11.

BEST MODE OF CARRYING OUT THE INVENTION

Embodiments of the present invention will now be described, with reference to the accompanying drawings.

Figure 1:
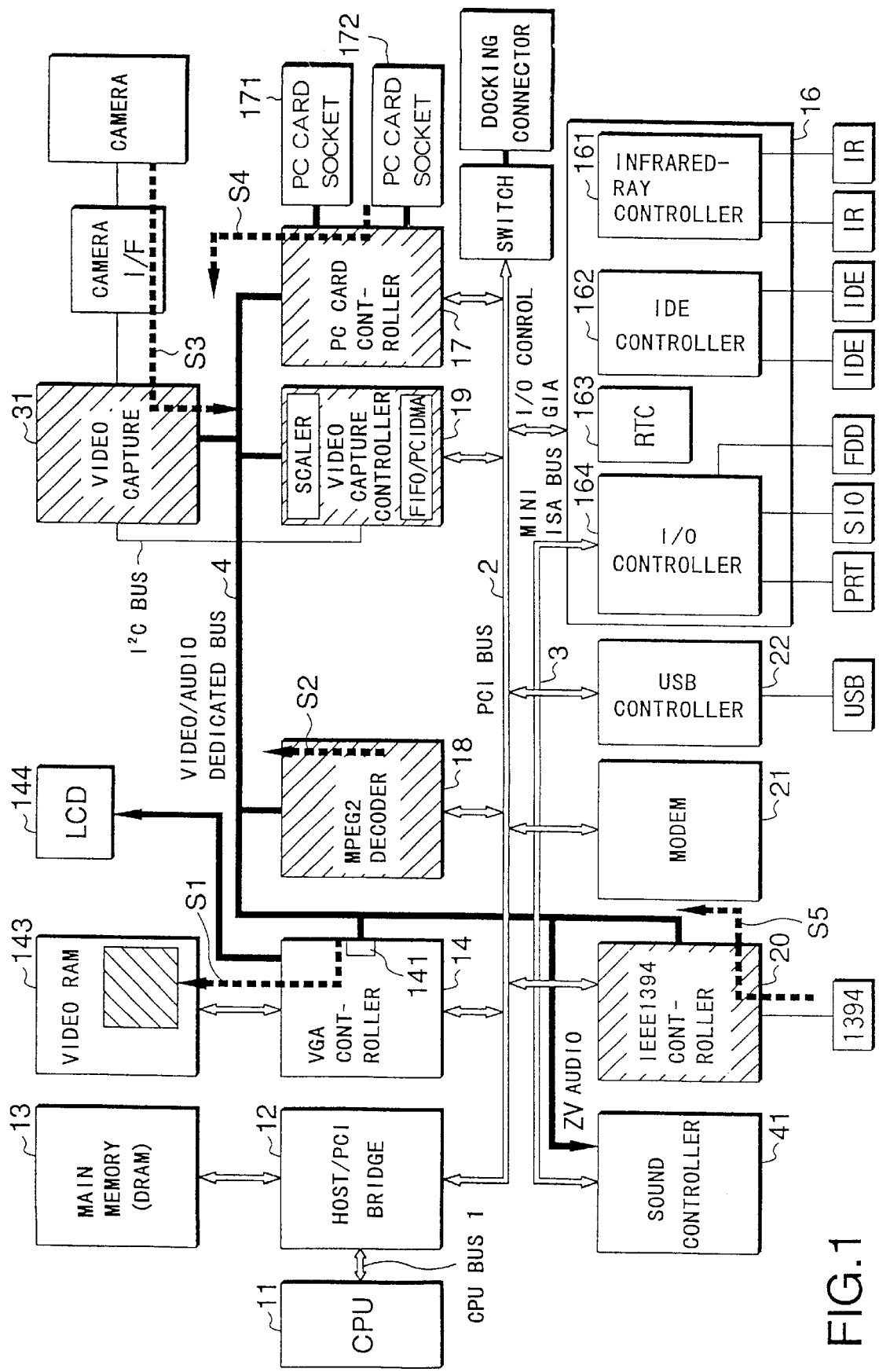
FIG. 1 is a block diagram showing a computer system according to one embodiment of the present invention.

FIG. 1 illustrates a computer system according to an embodiment of the invention. The computer system is a notebook- or laptop-type portable computer which can be battery-driven. The system has a system board, on which there are mounted a CPU bus 1, a PCI bus 2, a MINI-ISA bus 3, and a video/audio dedicated bus 4. The MINI-ISA bus 3 has a simplified bus structure, or is an ISA bus excluding some specified signal lines. The video/audio dedicated bus 4 connects a PC card socket 171 or 172, a display controller (VGA controller) 14 and a sound controller 41 in a point-to-point fashion.

The video/audio-dedicated bus 4 incorporates a video bus and an audio bus. The video bus comprises a YUY data signal line (for supplying 8-bit luminance data Y and 8-bit color-difference data UV), and signal lines for supplying horizontal and vertical sync signals (HREF, VSYNC) and pixel clock signals (PCLK).

An audio bus comprises signals lines including a line for supplying PCM signals for serially transferring audio data, a line for supplying a signal (LRCK) indicating whether the right- or left-channel audio data is being output, and a line for transferring a serial clock signal.

Also mounted on the system board are: a CPU 11, host/PCI bridge device 12, main memory 13, display controller (VGA controller) 14, I/O control gate array 16, PC card controller 17, MPEG2 decoder 18, video capture controller 19, IEEE1394 controller 20, modem 21, USB (Universal Serial Bus) controller 22, video capture 31 and sound controller 41.

Of these devices, the PC card controller 17, MPEG2 decoder 18, IEEE1384 controller 20 and video capture controller 19 (video capture 31) are devices which handles motion-picture data. Their motion-picture output ports are connected in common to the video/audio dedicated bus 4 so as to transfer motion-picture data to the display controller 14 through the video/audio dedicated bus 4.

The CPU 11 is, for example, a microprocessor "Pentium" manufactured and sold by Intel Inc., U.S.A. The CPU bus 1, which is connected to the input/output pins of the CPU 11, has a 64-bit data bus.

The main memory 13 is a memory device for storing operating systems, device drivers, application programs to be executed, and data to be processed. The memory 13 comprises a plurality of DRAM modules. The memory 13 is composed of a system memory and an extended memory. The extended memory has been mounted on the system board, as is needed, by the user. The DRAM modules constituting the system memory and extended memory are synchronous DRAMs or Rambuses.

The host-PCI bridge device 12 is provided between the CPU bus 1 and the internal PCI bus 2 has functions. One function is to convert a bus cycle including data and addresses in two directions. Another function is to achieve the access control of the main memory 13 via a memory bus.

The PCI bus 2 is a clock-synchronous input/output bus. All cycle on the PCI bus 2 is effected in synchronism with a PCI bus clock signal. The PCI bus clock signal has a maximum frequency of 33 MHz. The PCI bus 2 has an address/data bus which is used in time-division scheme. The address/data bus has a 32-bit width.

The data-transfer cycle on the PCI bus. 2 consists of an address phase and at least one data phase which follows the address phase. In the address phase, an address and a transfer type are output. In the data phase, 8-bit data, 16-bit data, 24-bit data or 32-bit data is output.

Like the host/PCI bridge device 12, the display controller (VGA controller) 14 is one of the bus masters for the PCI bus 2. It is provided to display the image data stored in a video memory (VRAM) 143 on a LCD 144 or an external CRT display. It serves to display VGA-type texts and graphics.

The display controller 14 has a video port (ZV port) 141 which is connected to video/audio dedicated bus 4 as is illustrated in the figure. The controller 14 has a function of displaying a motion-picture data stream S1 input to the video port 141, as a video window, on a display screen.

The I/O control gate array 16 is a one-chip LSI capable of performing a plurality of I/O control functions. In the present embodiment, the array 17 incorporates an infrared-ray controller 161, an IDE controller 612, a real-time clock (RTC) 163, and an I/O controller 164. The infrared-ray controller 161 controls infrared-ray communication between the array 16 and an external infrared-ray communications device. The IDE controller 162 controls devices having IDE (Integrating Drive Electronics) or an ATAPI (ATA Packet Interface), such as a hard disk drive, a CD-ROM drive and a DVD-ROM drive. The I/O controller 164 controls a printer port, a serial port (SIO) and a floppy disk drive (FDD) and also controls ISA-compatible devices such as the sound controller 41 provided on the MINI-ISA bus 3.

The PC card controller 17 is a PCI device. It controls a 16-bit PC card of PCMCIA specification and a 32-bit PC card of card-bus specification, under the control of the CPU 11. It serves to transfer motion-picture data through the video/audio-dedicated bus 4. The PC card controller 17 has two operating modes, i.e. normal mode and multimedia mode (ZV port mode). In the normal mode, the controller 17 controls ordinary PC cards such as a modem card, to transfer data between the PCI bus 2 and an ordinary PC card, using neither the video/audio dedicated bus 4 nor the ZV port 141.

The PC card controller 17 operates in the multimedia mode (ZV port mode) when PC cards processing motion-picture data, such as a video capture card, an MPEG2 encoder card and an MPEG2 decoder card, are set in the PC card sockets 171 and 172. In this mode, the video/audio-dedicated bus 4 is used, and a motion-picture data stream S4 is transferred from a PC card directly to the display controller 14 through the video/audio dedicated bus 4 and the ZV port 141.

It is the CPU 11 which switches the operating mode, from the normal mode to the multimedia mode, or vice versa. More precisely, the CPU 11 reads attribute data from the PC card set in a PC card socket and determines the type of the PC card from the attribute data. If the CPU 11 determines that the PC card is of a type, which accords with the multimedia mode, it sets the PC card controller 17 into the multimedia mode. Such switching to the multimedia mode is detailed in U.S. patent application Ser. No. 08/687,371

(PCT Application PCT/JP96/00111 filed Jan. 23, 1996, put into the U.S. national phase on Aug. 2, 1996; Inventor: Hiroki Zenda), the assignee of which is identical to the assignee of the present application.

The sound controller 41 controls the inputting and outputting of audio data under the control of the CPU 11. The controller 41 has the function of performing A/D conversion on the audio signals supplied from a microphone terminal and storing the digital data into the memory 13. It also has the function of converting digital data transferred through the video/audio dedicated bus 4 to analog signals and output these analog signals to a loudspeaker.

The MPEG2 decoder 18 has a PCI interface and a motion-picture output port which are connected to the PCI bus 2 and the video/audio dedicated bus 4, respectively. The MPEG2 decoder 18 receives via the PCI bus 2 the motion-picture data output from, for example, a DVD-ROM drive and converted to digital compressed codes by MPEG2, and then decodes the codes into motion-picture data. The motion-picture data thus obtained is converted to a motion-picture data stream S2 of 16-bit YUV data format. The data stream S2 is output onto the video/audio dedicated bus 4 and transferred to the video input port (ZV port) 141 of the display controller 14.

In an MPEG2 data stream read from a DVD-ROM drive, encoded data items representing main images (video) of movie or the like, sub-images (sub-pictures) such as subtitles, and audio signals are multiplexed. The sub-images are encoded by run-length encoding, and the audio signals are encoded by the Dolby Digital system. It is therefore desired that the MPEG2 decoder 18 incorporate three decoders and that these decoders be operated simultaneously to decode DVD video data including such three data streams of different types. The three decoders are an MPEG2 decoder for decoding main picture data, a sub-capture decoder for decoding sub-picture data, and an audio decoder for decoding audio signals. The video data decoded by the MPEG2 decoder and the sub-picture data decoded by the sub-picture capture decoder are synthesized into data of 16-bit YUV data format, which is output onto the video bus included in the video/audio dedicated bus 4. The audio signals decoded by the audio decoder are transferred in a serial data transfer format through the audio bus included in the video/audio-dedicated bus 4.

Figure 2:
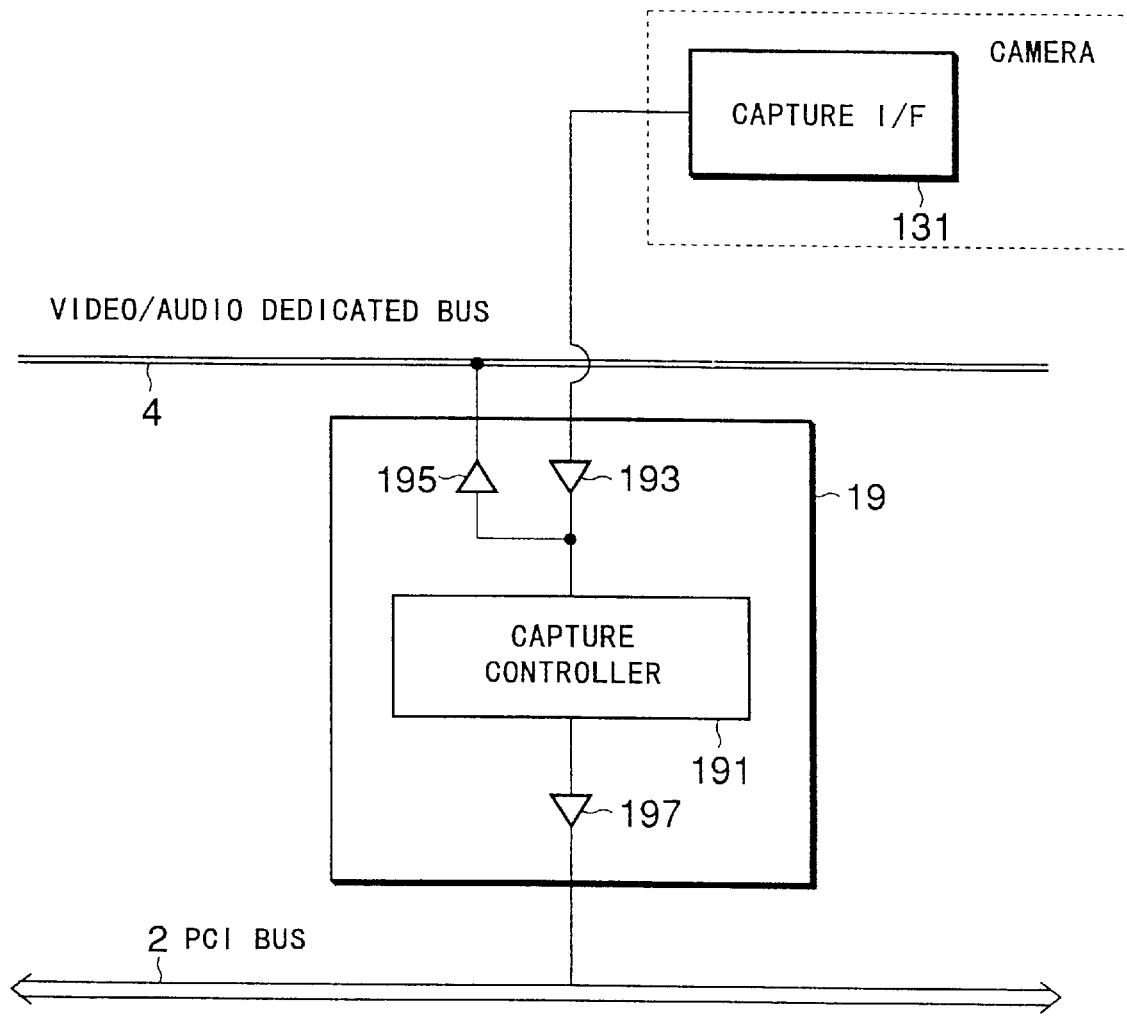
FIG. 2 is a block diagram showing in detail the connection between the video capture and video capture controller illustrated in FIG. 1.

The video capture controller 19 transfers the video data acquired from the video capture 31 either to the video port 141 via the video/audio dedicated bus 4, or to the main memory 13 through the PCI bus 2, in accordance with an instruction supplied from the CPU 11. That is, as shown in FIG. 2, the video data output through a capture I/F 131 is first stored in a buffer circuit 193 provided in the video capture controller 19, and then fetched into a capture controller 191. The capture controller 191 outputs the video data to the video/audio dedicated bus 4 via a buffer circuit 195 if the controller 191 is so instructed by the CPU 11. The video capture controller 19 controls the video capture 31 in accordance with instructions supplied through an I2C bus.

If instructed by the CPU 11 to output the video data to the PCI bus 2, the capture controller 191 outputs the video data to the PCI bus 2 through the buffer circuit 197. To transfer motion-picture data form the video/audio dedicated bus 4 to the main memory 13, the scaler incorporated in the controller 191 performs a scale-down process on the motion-picture data, thereby decreasing the data transfer rate as is required in view of the band width of the PCI bus 2.

(The scale-down process includes changing of the frame rate and resolution, converting the color format, and the like.) The motion-picture data thus processed is stored into a FIFO buffer. The data in the FIFO buffer is transferred to the main memory 12 by means of DMA transfer.

The IEEE1394 controller 20 is provided to control data transfer between the computer system and an external apparatus, which is achieved through an IEEE1394 high-speed serial interface. The controller 20 has a PCI interface and a motion-picture output port. The PCI interface is connected to the PCI bus 2, and the motion-picture output port to the video/audio dedicated bus 4. Upon receipt of motion-picture data from a digital video camera or the like via the IEEE1394 high-speed serial interface, the IEED1394 controller 20 converts the motion-picture data to a motion-picture data stream S5 of 16-bit YUV data format. The data stream S5 is transferred to the display controller 14 through the video bus included in the video/audio dedicated bus 4.

The video capture 31 is connected to the video/audio dedicated bus 4 (and the video port 141) by the video capture controller 19. The video capture 31 receives motion-picture data input from a video camera, an image sensor or the like through a camera interface, and converts the data to a motion-picture data stream S3 of 16-bit YUV data format. The data stream S3 is transferred to the display controller 14 under the control of the video capture controller 19 as described above.

In the system shown in FIG. 1, a plurality of video devices which handle motion-picture data items of different type, i.e. the PC card controller 17, MPEG2 decoder 18, IEEE1394 controller 20 and video capture 31, have a motion-picture output port each, in addition to an interface connected to the PCI bus 2. The motion-picture output port is connected to the video/audio-dedicated bus 4. Therefore, various motion-picture sources can be transferred to the display controller 14, directly via the video/audio-dedicated bus 4, without using the PCI bus 2. Hence, various video sources can be displayed with high efficiency.

The video/audio-dedicated bus 4 can transfer but only one motion-picture data item at a time. The present system therefore incorporates a control unit for controlling the switching of motion-picture sources. The control unit selects the PC card controller 17, the MPEG2 decoder 18, the P1394 controller 20, or the video capture controller 19 (video capture 31) and connects the device selected to the video/audio dedicated bus 4. Thus, only one device uses the video/audio-dedicated bus 4 at a time.

Some devices for controlling the switching of motion-picture sources will be explained below.

(1) The first control device will be described, with reference to FIGS. 2 to 4.

Figure 3:
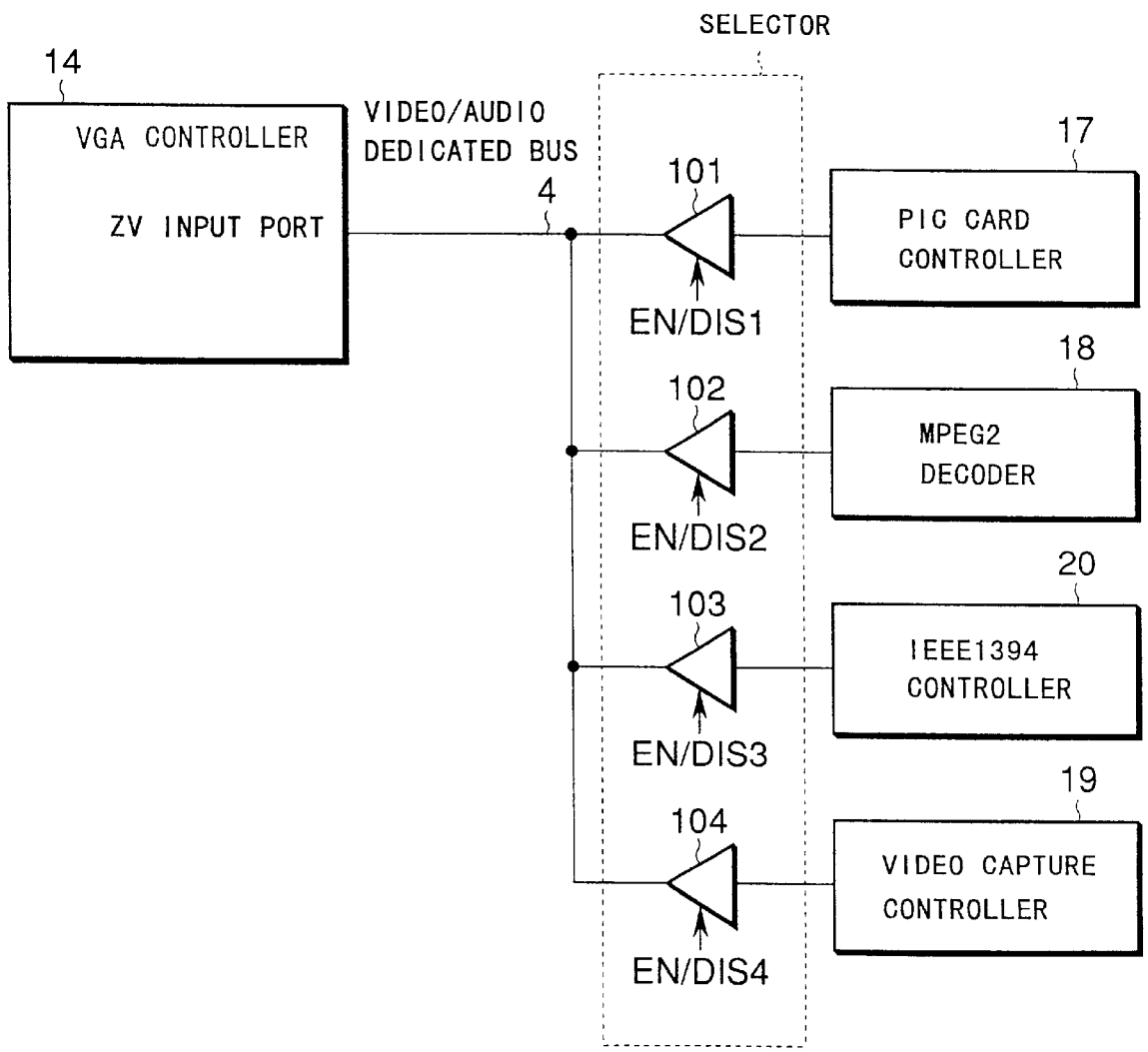
FIG. 3 is a diagram explaining the principle of switching devices, for connecting one of the devices to the video/audio dedicated bus provided in the system.

As shown in FIG. 3, a selector is provided for selecting the motion-picture output port of the PC card controller 17, MPEG2 decoder 18, IEEE1394 controller 20 or video capture controller 19. The motion-picture output port, thus selected, is connected to the video/audio dedicated bus 4. Motion-picture data can therefore be transferred to the display controller 14, but from only one device at a time. Namely, one video/audio dedicated bus 4 can connect the PC card controller 17, MPEG2 decoder 18, IEEE1394 controller 20 and video capture controller 19 can be connected in point-to-point fashion. This prevents collision of. data on the video/audio-dedicated bus 4.

The selector comprises 3-state output buffers 101, 102, 103 and 104. The buffers 101 to 104 are connected at input, respectively to the motion-picture output ports of the PC card controller 17, MPEG2 decoder 18, IEEE1394 controller 20 and video capture controller 19, and at output to the video/audio dedicated bus 4. The buffers 101 to 104 receive, respectively, four enable/disable signals (EN/DIS1, EN/DIS2, EN/DIS3 and EN/DIS4) which can be controlled by a command from the CPU 11. Each 3-state output buffer outputs or does not output motion-picture data to the bus 4, in accordance with the enable/disable signal it has received.

When this control device is used, each video device outputs motion-picture data to the video/audio dedicated bus 4 only if the command supplied from the CPU 11 enables it to transfer the motion-picture data.

That is, the software the CPU 11 executes allows the output buffer of only one device, at a time, to output the motion-picture data. Data collision on the video/audio-dedicated bus 4 can be thereby prevented. Further, all output buffers except the one enabled to output data are electrically isolated from the video/audio dedicated bus 4 since they are disabled, or set in a high-impedance output state.

As FIG. 4 shows, the selector shown in FIG. 3 has, besides the 3-state output buffers 101, 102, read/write registers 201, 202, . . . which are controlled by the CPU 11 to store and output data. When the enable flag F1 of, for example, the register 201 is set, the enable/disable signal EN/DIS1 supplied to the 3-state output buffer 101 becomes active. The device 1 can then transfer motion-picture data through the video/audio-dedicated bus 4.

(2) The second control device will be described, with reference to FIGS. 5, 6A, 6B and 7.

Figure 5:
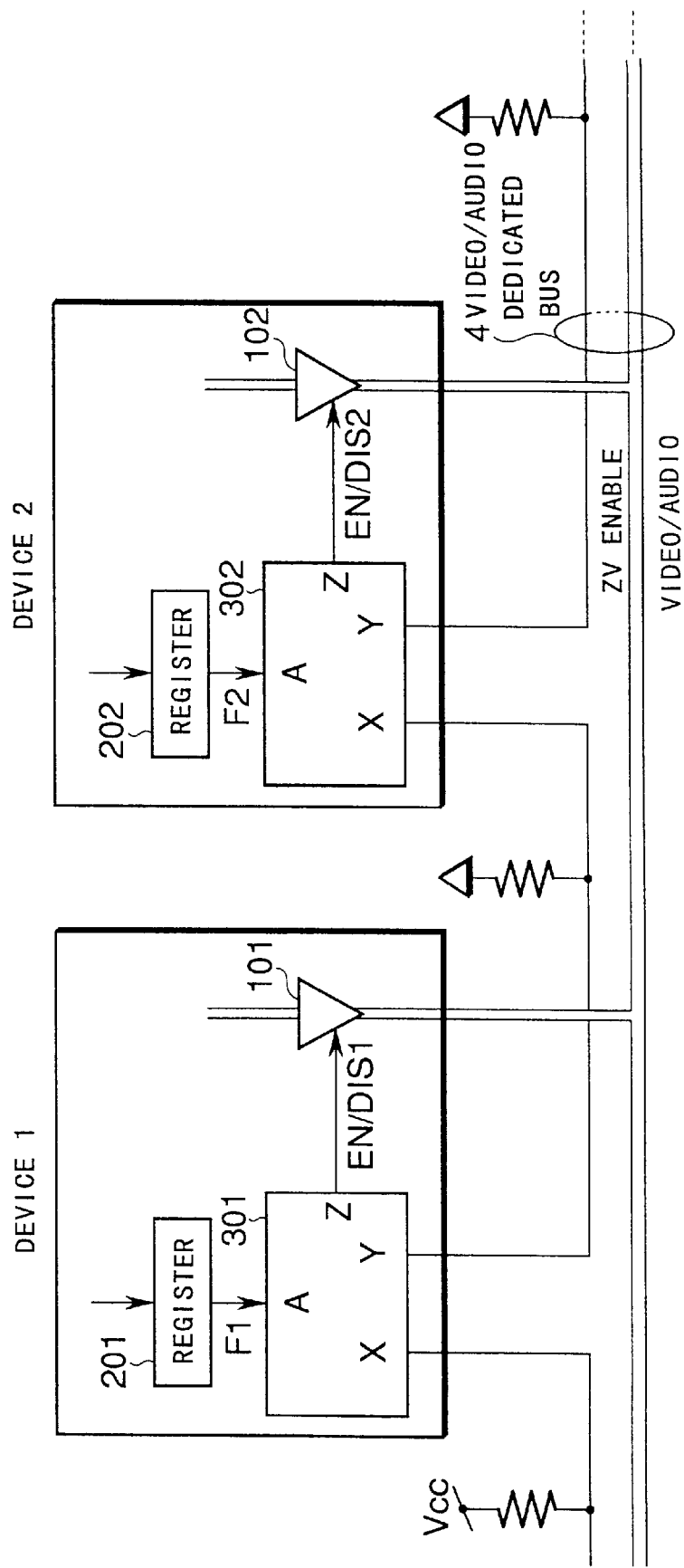
FIG. 5 is a diagram depicting the combinatorial logic circuits incorporated in devices which are switched in a second switching control mode to be connected to the video/audio dedicated bus in the system.

As can be seen from FIG. 5, the order in which the devices are to use the video/audio dedicated bus 4 is automatically determined by means of hardware control. More specifically, one ZV enable signal line is connected to the video/audio dedicated bus 4. The ZV enable signal line connects a plurality of devices (i.e. PC card controller 17, MPEG2 decoder 18, P1394 controller 20 and video capture controller 19), forming a daisy chain. The ZV enable signal line is provided to transfer a ZV enable signal sequentially to the devices, first to the device at the head of the daisy chain and finally to the device at the end thereof. The ZV enable signal enables any device to use the video/audio-dedicated bus 4.

The devices have combinatorial logic circuits 301, 302, . . ., respectively, in addition to 3-state output buffers 101, 102, . . . and register 201, 202, . . . The combinatorial logic circuits 301, 302, . . . generates a ZV enable/disable signal on the basis of the enable flag F1 set by the CPU 11 and the ZV enable signal transferred through the ZV enable signal line. Each of the combinatorial logic circuits has an input terminal A, a ZV enable signal input terminal X, an enable/disable signal output terminal Z, and a ZV enable signal output terminal Y. The input terminal A receives the enable flag F1. A ZV enable signal is output from the ZV enable signal output terminal Y to the next device.

FIG. 6A is a truth table showing the values the output Y may have in accordance with the inputs X and A. FIG. 6B is a truth table representing the values the output Z may have in accordance with the inputs X and A.

If input X=1 (if the ZV enable signal input is active) when input A=1 (when the enable flag F1 is set, indicating that motion-picture data can be transferred), output Z=1, enabling the output buffer. In this case, output Y=0, and the transfer of the ZV enable signal to the next device is stopped. When input A=0 (when the enable flag F1 is not set, indicating that motion-picture data cannot be transferred), the input X remains unchanged and becomes the output Y. If input X=0, outputs Y and Z are 0, regardless of the value of input A.

Figure 7:
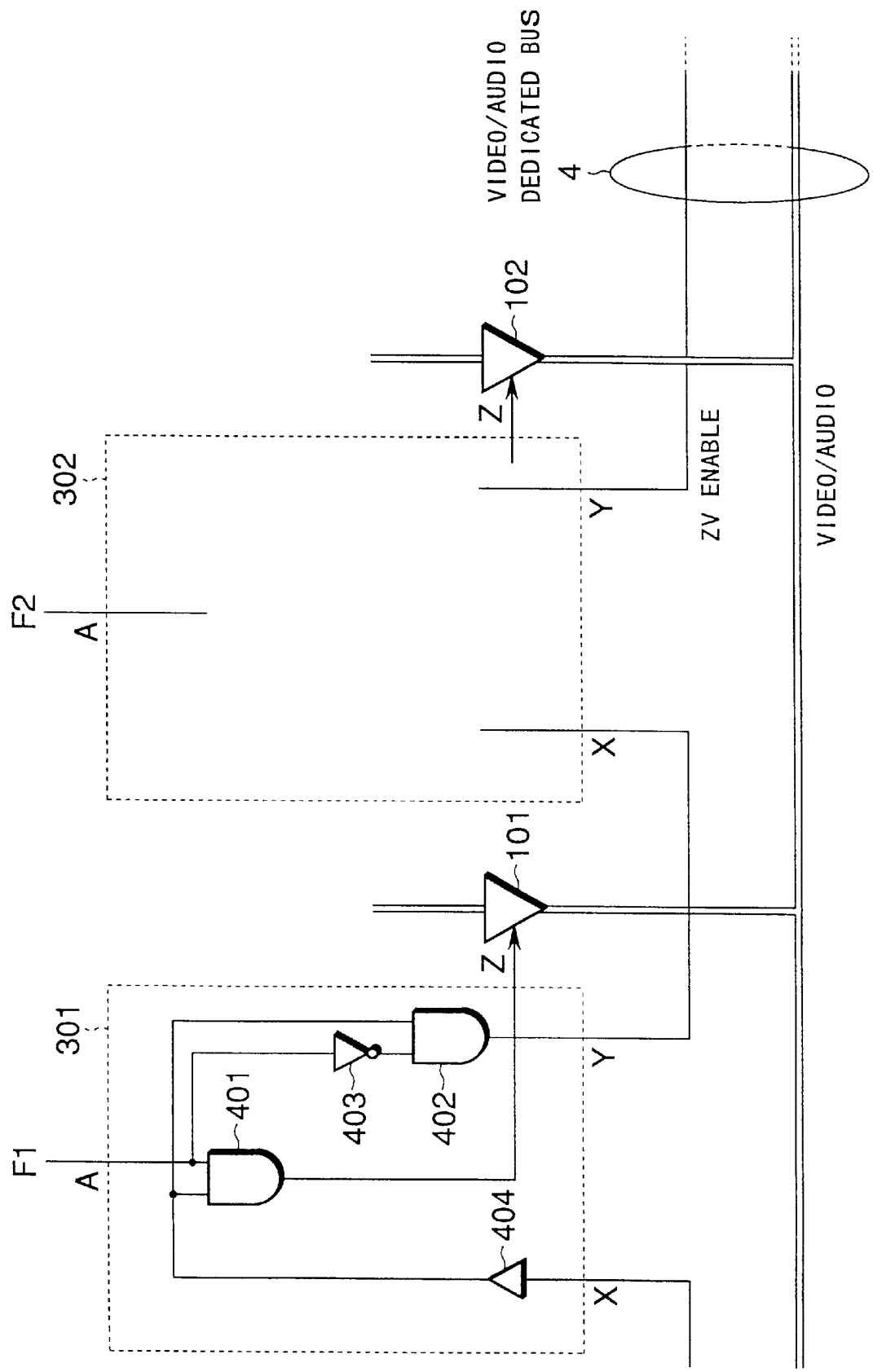
FIG. 7 is a circuit diagram showing an example of the combinatorial logic circuits shown in FIG. 5.

Each of the combinatorial logic circuits 301 and 302 can comprise two 2-input NAND gates 401 and 402, an inverter 403 and an input buffer 404, as is shown in FIG. 7.

The more upstream the device is located in the daisy chain, the higher priority it has to use the video/audio dedicated bus 4. (Here, the device 1 is located at the most upstream position.) The ZV enable signal is not transferred to any device located downstream of the device allowed to use the video/audio dedicated bus 4, until the device finishes using the video/audio dedicated bus 4. Therefore, automatic control is achieved to allow, at a time, only the output buffer of only one device to operate. The input X to the most upstream device is always set at the value of "1."

(3) The third control device will be described, with reference to FIGS. 8 and 9 and FIGS. 10A to 10E.

Figure 8:
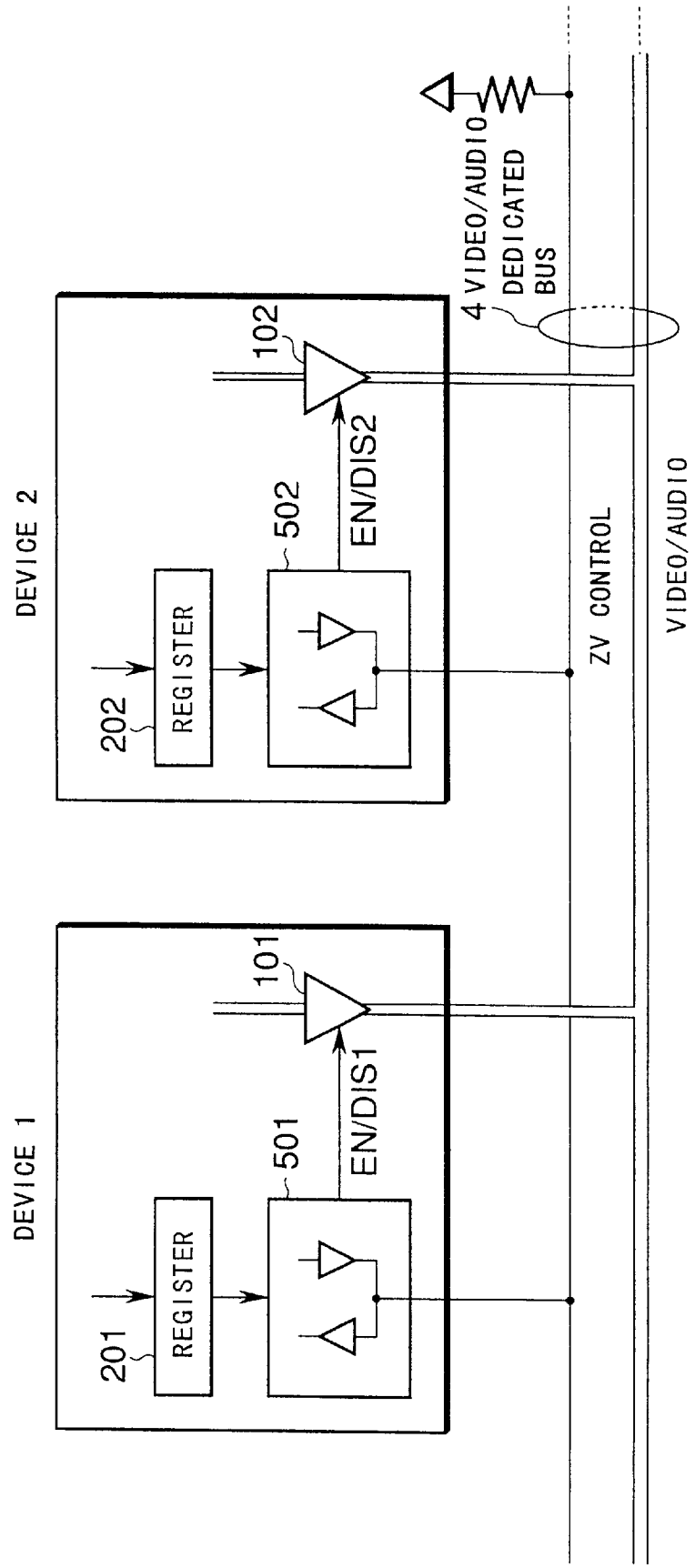
FIG. 8 is a diagram depicting the combinatorial logic circuits incorporated in devices which are switched in a second switching control mode to be connected to the video/audio dedicated bus in the system.

As shown in FIG. 8, the video/audio-dedicated bus 4 includes an additional ZV control signal line. This signal line is connected in common to all devices. The ZV control signal line is provided to supply a signal indicating that one device is requesting for the use of the video/audio dedicated bus 4, to all other devices. The signal line is activated for a predetermined period by the device which is requesting for the use of the video/audio-dedicated bus 4.

The devices have combinatorial logic circuits 501, 502, . . ., respectively, in addition to 3-state output buffers 101, 102, . . . and register 201, 202, . . . . Each of the combinatorial logic circuits 501, 502, . . . renders the ZV control signal line active for the predetermined period, in response to the enable flat F1 set by a command supplied from the CPU 11. Upon lapse of the predetermined period, the combinatorial logic circuit sets the output buffer into an active state. Further, it monitors the state of the ZV control signal line and maintains the output buffer in disabled state while the ZV control signal line remains active.

Figure 9:
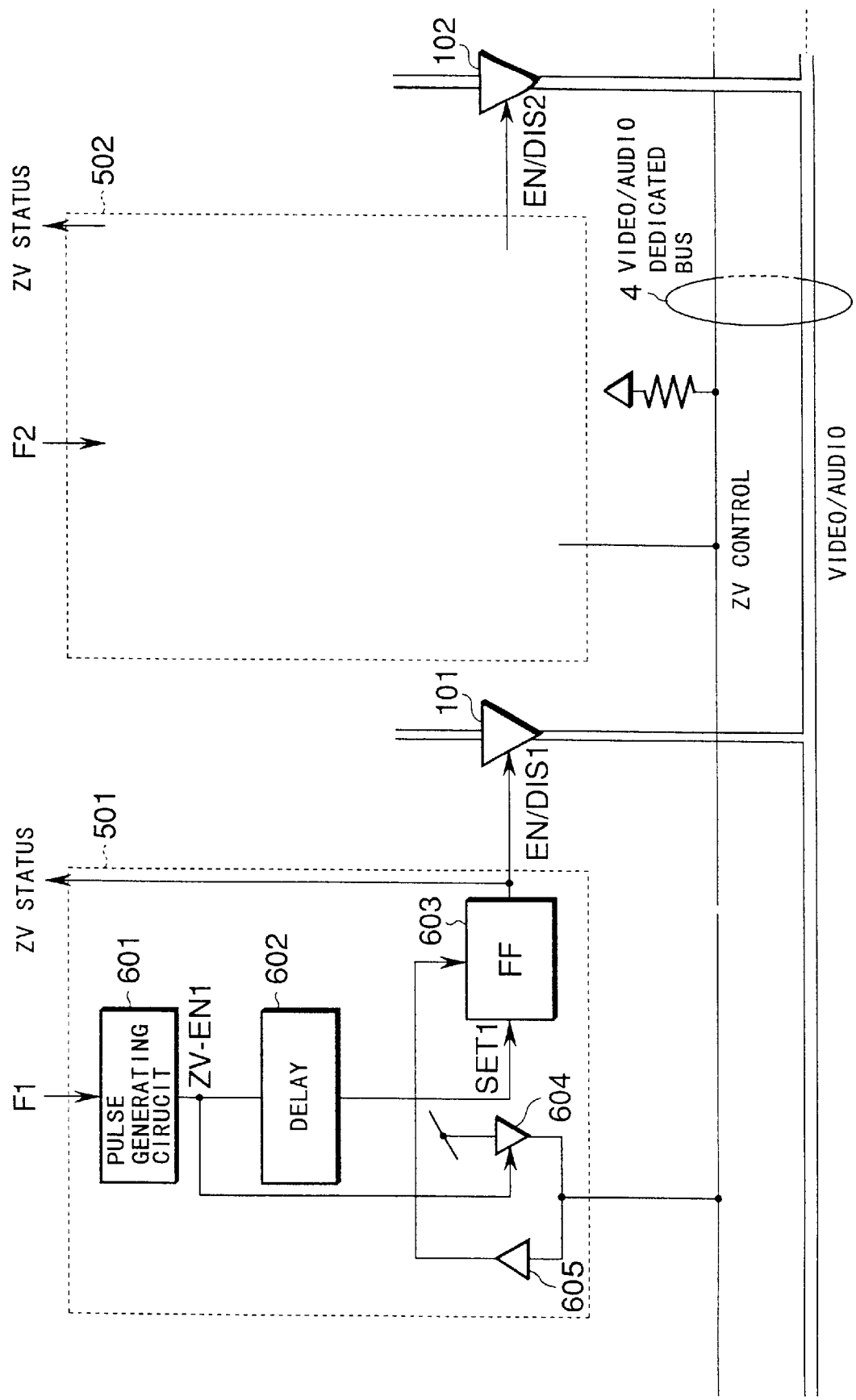
FIG. 9 is a circuit diagram depicting an example of the combinatorial logic circuits shown in FIG. 8.

As shown in FIG. 9, each of the combinatorial logic circuits 501, 502, . . . comprises a pulse generating circuit 601, a delay circuit 602, a flip-flop 603, a ZV control signal output buffer 604, and a AV control signal output buffer 605.

The operation of each of the combinatorial logic circuits shown in FIG. 9 will be explained, with reference to the timing chart of FIGS. 10A to 10E. Here it is assumed that the enable flag F1 is set in the register 201 of the device 1 while the output buffer 102 of the device 2 remains enabled.

In the device 1, the pulse generating circuit 601 outputs a one-shot pulse signal ZV-EN1 when the enable flag F1 is set. The one-shot pulse signal ZV-EN1 is supplied to the delay circuit 602. It is also supplied, as a ZV control signal, onto the ZV control signal line through the buffer 604. The combinatorial logic circuits of all devices monitor the change in the ZV control signal, which takes place at this time. In the device 1, the flop-flop 603 is reset. In the device 2, the flip-flop is reset, too. The enable/disable signal EN/DIS2 is thereby disabled.

Upon lapse of the time corresponding to the width of the one-shot pulse signal ZV-EN1, the display circuit 602 outputs a set signal SET1. The set signal SET1 is supplied to the flip-flop 603. The flip-flop 603 changes the enable/disable signal EN/DIS1 to 1, or activates the signal EN/DIS1, in response to the set signal SET1.

Thus, the output buffers of all devices are disabled by using the ZV control signal line. Then, only the device that has last activated the ZV control signal line by enabling the output buffer is allowed to use the video/audio-dedicated bus 4. Hence, priority can be equally assigned to any device at the initial stage of operation.

(4) The fourth control device will be described, with reference to FIG. 11, FIGS. 12A to 12C and FIGS. 13A to 13H.

Figure 11:
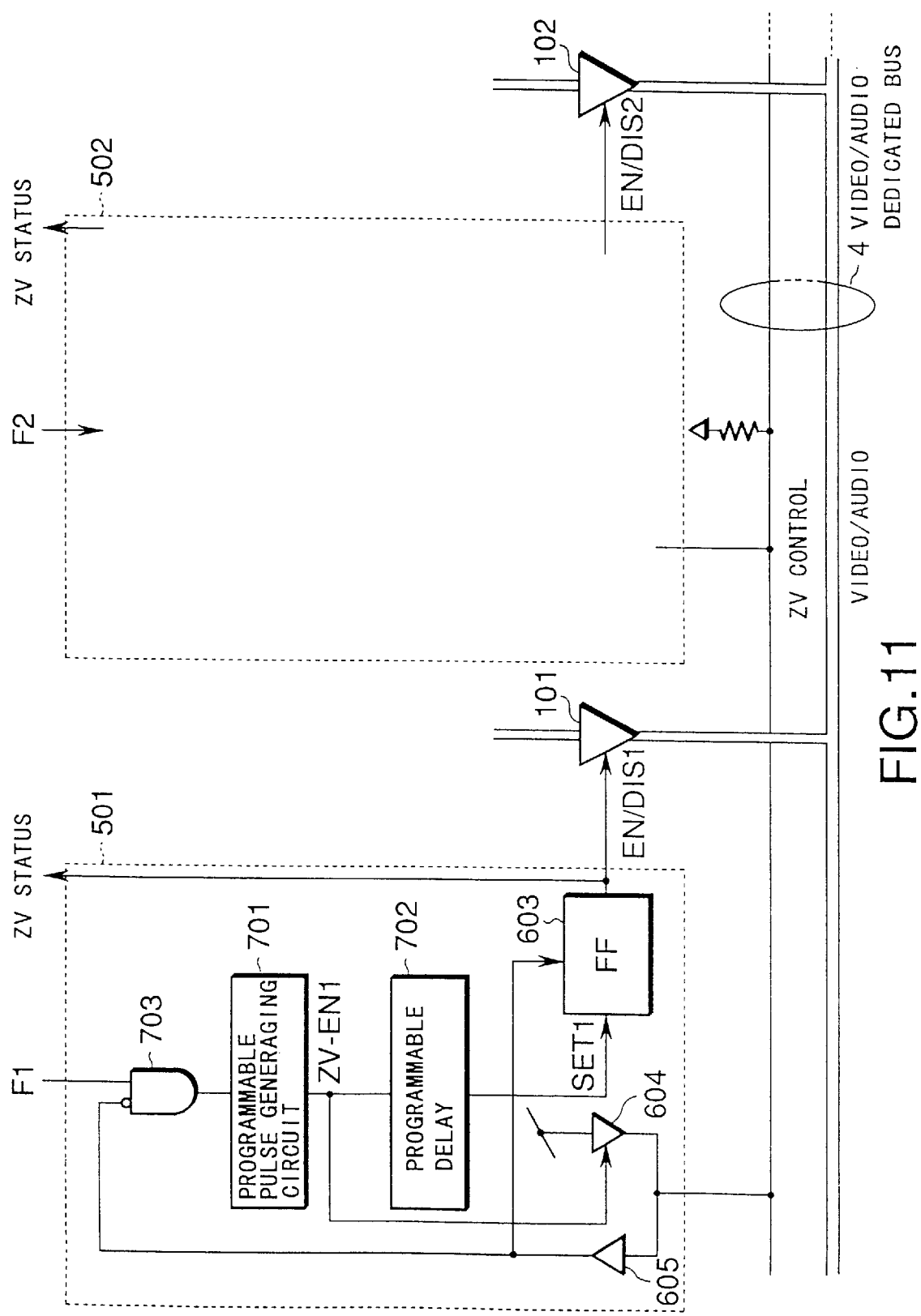
FIG. 11 is a diagram showing the combinatorial logic circuits incorporated in devices which are switched in a third switching control mode to be connected to the video/audio dedicated bus in the system.

The combinatorial logic circuits shown in FIG. 11 are modifications of the combinatorial logic circuits explained with reference to FIG. 9. That is, a programmable pulse generating circuit 701 and a programmable delay circuit 702 are used in place of the pulse generating circuit 601 and the delay circuit 602, respectively. The circuit 701 can generate a pulse. whose width can be programmable by the CPU 11. The circuit 702 can delay an input signal by any time programmable by the CPU 11. Furthermore, each combinatorial logic circuit comprises an additional component, i.e. an AND gate 703.

The width of the pulse signal generated from the programmable pulse generating circuit 701 is initially set at a different value for each device, as is illustrated in FIGS. 12A to 12C. Similarly, the delay time of the programmable delay circuit 702 is initially set at a different value for each device.

Thus, even if the enable flag is set in two or more devices at the same time, only the device to which the longest pulse width is allocated is allowed to use the video/audio-dedicated bus 4. Data collision on the video/audio-dedicated bus 4 can be thereby prevented.

The ZV control signal may be active when the ZV enable flag is set. In this case, the AND gate 703 prevents the circuit 701 from generating a pulse signal ZV-EN1, until the ZV control signal line is released from the active state.

The device in which an enable flag has been most recently set from the CPU 11 can therefore be allowed to use the video/audio-dedicated bus 4. Should an enable flag be set in a first device whose pulse width is short immediately after an enable flag is set in a second device whose pulse width is longer, the first device is allowed to use the video/audio-dedicated bus 4 prior to the second device.

The operation of each of the combinatorial logic circuits shown in FIG. 11 will be explained, with reference to the timing chart of FIGS. 13A to 13H. Here it is assumed that the enable flag F1 is set simultaneously in the devices 1 and 2 while the output buffer 103 of the device 3 remains enabled.

In the device 1, the pulse generating circuit 701 outputs a one-shot pulse signal ZV-EN1 when the enable flag F1 is set while the ZV control signal remains at the value of 0. At the same time, the device 2 outputs a one-shot pulse signal ZV-EN2. These pulse signals change the potential of the ZV control signal, whereby the flip-flops of all devices are reset. Therefore, in the device 3, the enable/disable signal EN/DIS3 is switched into a disabled state.

In the device 2, a set signal SET2 is output upon lapse of the time corresponding to the pulse width of the one-shot pulse signal ZV-EN2. The set signal SET2 is supplied to the flip-flop. However, the set signal SET2 is masked, because the one-shot pulse signal ZV-EN1 is still being output at this time. The flip-flop has yet to be set.

In the device 1, a set signal SET1 is output upon lapse of the time corresponding to the pulse width of the one-shot pulse signal ZV-EN1. At this time, the one-shot pulse signal ZV-EN2 has not been generated. Therefore, the flip-flop 603 sets the enable/disable signal EN/DIS1 at the value of 1, in accordance with the set signal SET1. In other words, it renders the signal EN/DIS1 active.

(5) The fifth control device will be described, with reference to FIGS. 14 and 15.

Here it will be explained how a control device of the type described in the paragraphs (1) switches the devices by means of software control so that only one device may use, at a time, the video/audio-dedicated bus 4. FIG. 14 represents the configuration of the software designed to switch the devices in such a manner.

Figure 14:
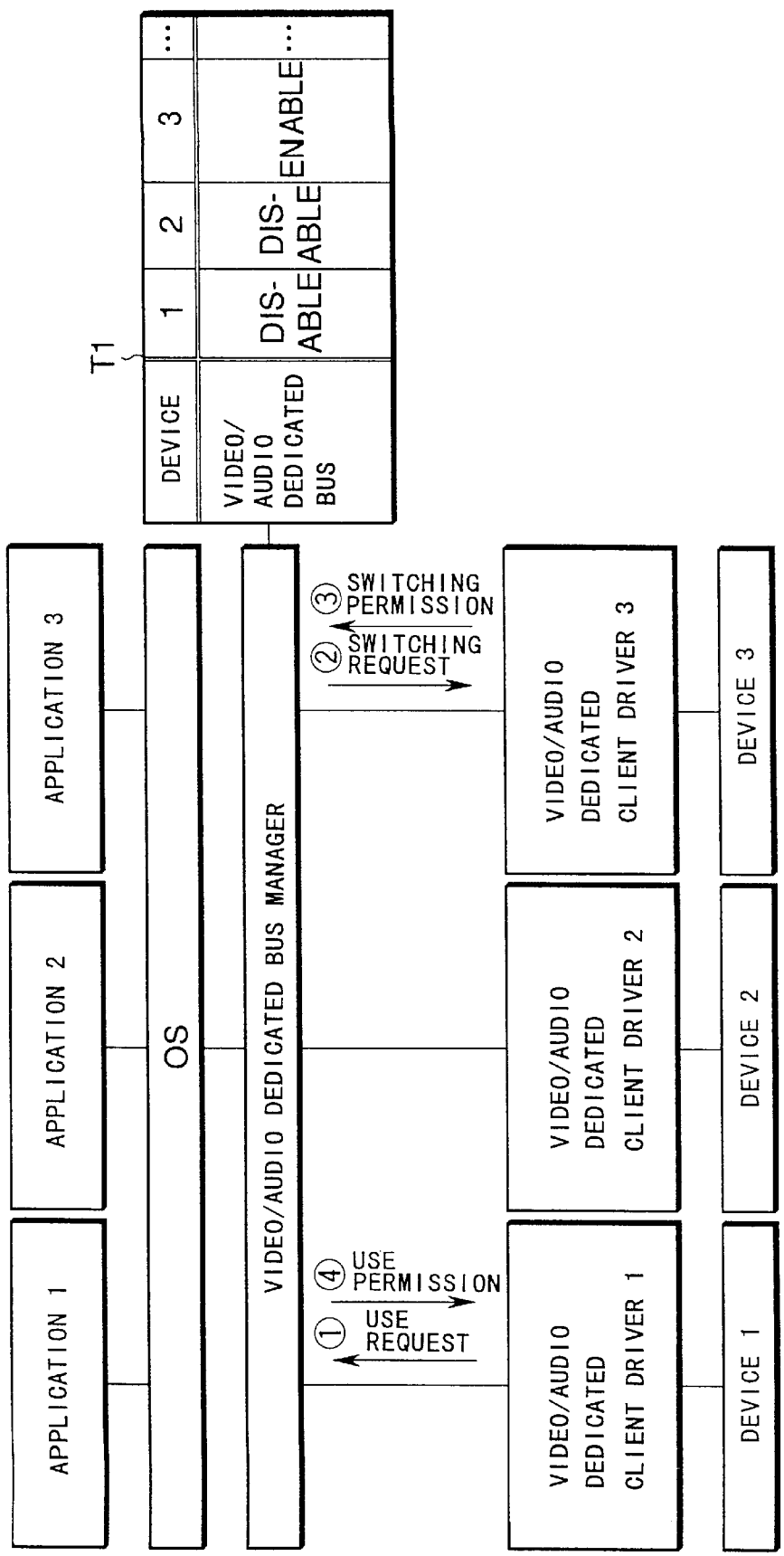
FIG. 14 is a diagram illustrating the software configuration which is used to switch the devices in a fourth switching control mode in the system.
Figure 15:
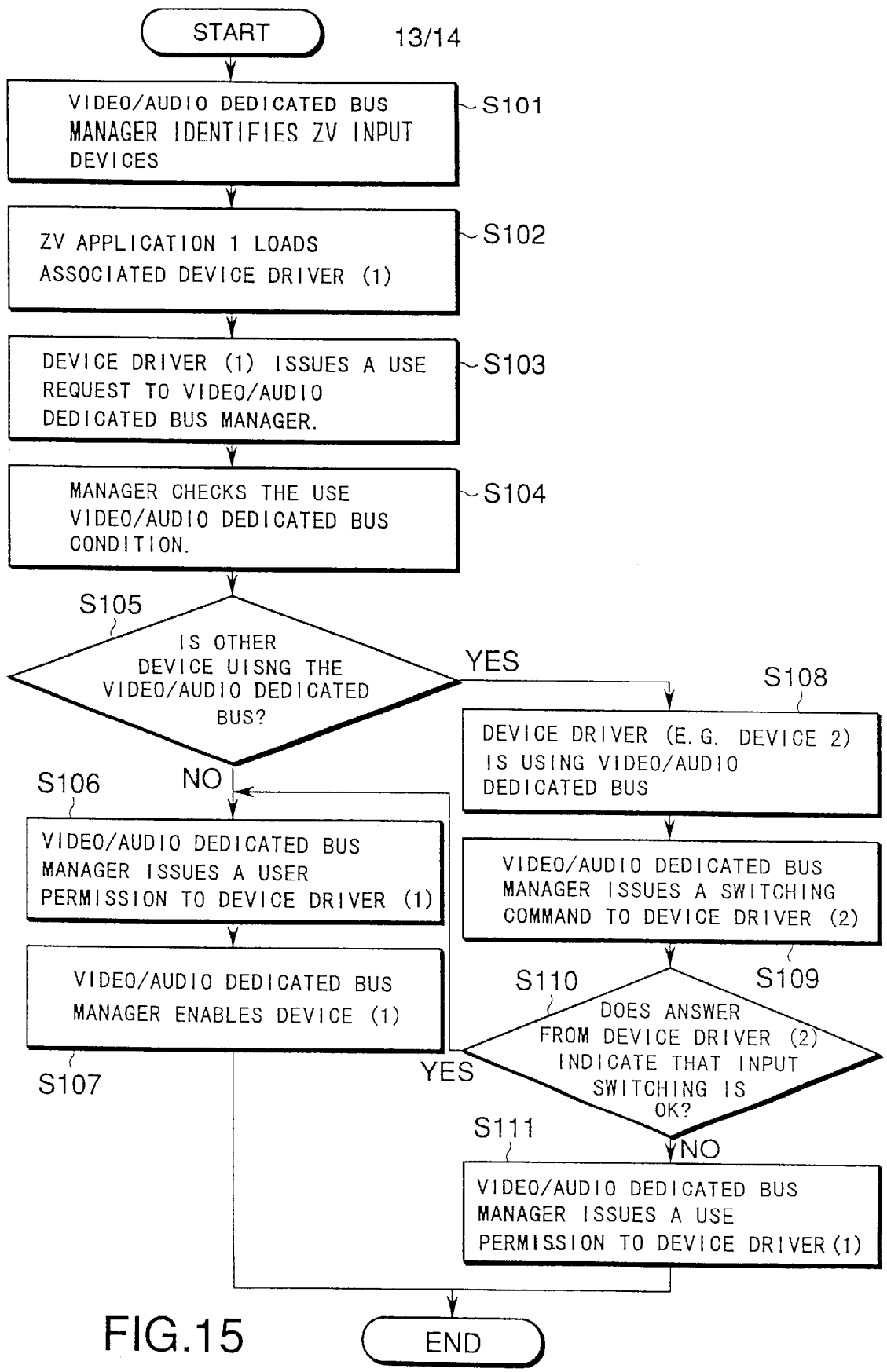
FIG. 15 is a flow chart explaining how the devices are switched to be connected to the video/audio dedicated bus, by means of the software shown in FIG. 14.

FIG. 14 shows various programs. The video/audio-dedicated bus manager is a program designed to manage the use of the video/audio-dedicated bus 4. The application programs 1, 2 and 3 cause devices 1, 2 and 3, respectively, to use the video/audio-dedicated bus 4 in order to display motion pictures. The video/audio-dedicated bus client drivers 1, 2 and 3 are driver programs for controlling the devices 1, 2 and 3, respectively.

The video/audio-dedicated bus manager has the function of communicating with the video/audio-dedicated bus client drivers 1, 2 and 3. Using this function, it switches the right to the use of the video/audio-dedicated bus 4 among the devices, as will be briefly described below.

Assume that the video/audio-dedicated bus client driver 1 issues a request for the use of the video/audio-dedicated bus 4. Then, the video/audio-dedicated bus manager refers to the management table T1 which manages, for each device, the use of the video/audio-dedicated bus 4, thereby determining which device is now using the video/audio-dedicated bus 4. The manager supplies a signal to the video/audio-dedicated bus client driver associated with the device which is using the bus 4 (e.g., the video/audio-dedicated bus client driver 3). This signal shows that one of the other client drivers has issued a request for the use of the video/audio-dedicated bus 4. The manager then supplies a signal to the client driver 1 which has issued the request, said signal indicating whether the right to use the bus 4 can be switched or not. If the signal shows that the right to use the bus 4 can be switched, the manager rewrites the management table T1 and switches the right to use the video/audio-dedicated bus 4. The right to use the bus 4 can be switched by setting the enable flag in the device which is to use the video/audio-dedicated bus 4 and resetting the enable flag in the device which is to release the right to use the bus 4. The video/audio-dedicated bus client driver associated with the device which is to use the video/audio-dedicated bus 4 effects the setting and resetting of the enable flag.

The sequence of operations for switching the right to use the bus 4 will be explained, with reference to the flow chart of FIG. 15.

When the operating system is activated or when a PC card or the like which can use the bus 4 is inserted into or pulled from a card socket, the video/audio-dedicated bus manager counts devices which are incorporated in the computer system and which can use the bus 4. The manager also prepares the management table T1, which manages, for each device, the use of the video/audio-dedicated bus 4 (Step S101).

If the devices are ISA devices, particularly PNPID devices and PCI devices, the manager counts these devices in the following way. First, the manager refers to the information (INF) file. Next, it checks the device IDs, vender IDs and subsystem device IDs included in the information file, thereby counting the devices. If ZV device information is found in the INF file, the manager writes the ZV device information in the OS registry. In this case, the manager refers to the information in the registry, thereby counting the devices.

Figure 16:
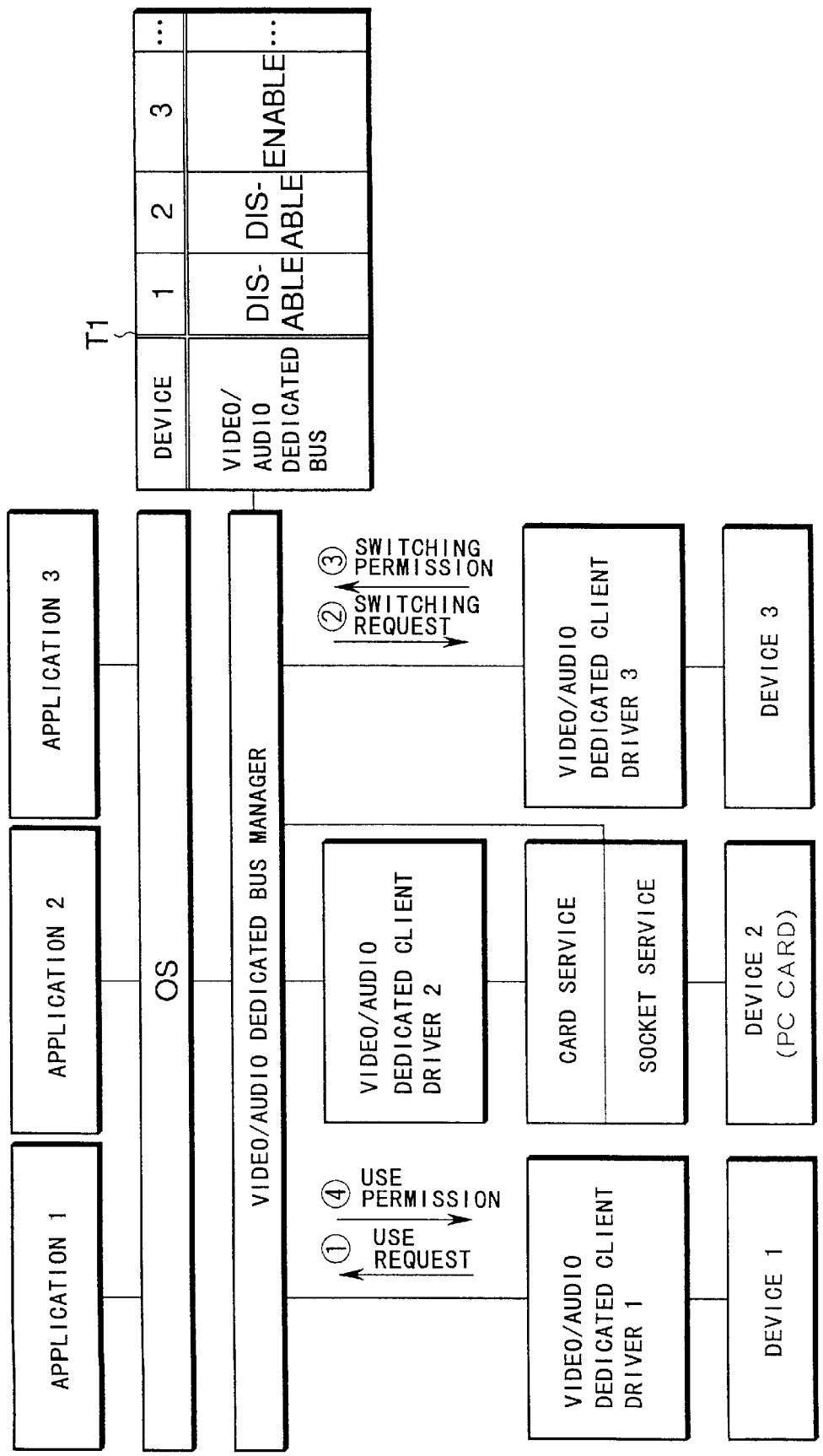
FIG. 16 is a diagram illustrating another software configuration which is used to switch the devices in a fourth switching control mode in the system.

A PC card may be inserted to the card socket while the system is operating. If so, the drivers of socket service driver and card service, both shown in FIG. 16. The drivers supply a signal indicating the insertion, to the video/audio-dedicated bus manager. In response to the signal, the video/audio-dedicated bus manager determines, from the attribute information of the card, whether or not the card can use the video/audio-dedicated bus. If the card is found to be capable of using the bus 4, it suffices to add the device to the management table T1. When the PC card is pulled from the card socket while the system is operating, the manager determines, from the ID number or attribute information of the card socket, whether or not the card has been counted as one that can use the video/audio-dedicated bus 4. If the card is found to have been so counted, it suffices to delete the device from the management table T1.

When an application is executed, which involves the transfer of motion-picture data through the video/audio-dedicated bus 4, the application loads the corresponding video/audio-dedicated client driver into the main memory 13 (Step S102). The video/audio-dedicated client driver, thus loaded, issues a request for the bus 4 to the video/audio-dedicated bus manager (Step S103). The video/audio-dedicated bus manager refers to the management table T1, determining whether or not any other device is using the video/ audio-dedicated bus 4 (Step S105).

If no device is using the video/ audio-dedicated bus 4, the video/audio-dedicated bus manager issues use permission to the video/audio-dedicated bus client driver which has made a request for the bus 4 (Step S106). Upon receipt of the use permission, the video/audio-dedicated bus client driver sets an enable flag in the register of the associated device. The output buffer of the device is thereby set into operable state (Step S107). At this time, video/audio-dedicated bus manager writes data showing that the device is using the video/audio-dedicated bus, in that part of the management table T1 which is assigned to the device.

If any device is using the video/audio-dedicated bus 4, the video/audio-dedicated bus manager identifies the device. The manager then supplies a signal to the video/audio-dedicated bus client driver associated with the device, said signal indicating that another video/audio-dedicated bus client driver has issued a request for the video/audio-dedicated bus 4 (Steps S108 and S109). Upon receipt of the request for the bus 4, the video/audio-dedicated bus client driver answers whether or not the right to use the video/audio-dedicated bus 4 can be switched.

For example, a video/audio-dedicated bus client driver associated with an application which display and record a motion pictures by using the video capture 31 may reject the request for switching the right to use the bus 4 in order to prevent an interruption of recording of the motion picture. If this is the case, the video/audio-dedicated bus manager issues a use prohibition to the video/audio-dedicated bus client driver which has issued the request for the bus 4 (Steps S110 and S111).

If the video/audio-dedicated bus client driver answers that the right to use the video/audio-dedicated bus 4 can be switched, Steps S106 and S107 are performed in sequence.

In this case, the video/audio-dedicated bus manager is provided, independent of the OS. Instead, the manager may be incorporated in the OS, as one function of the OS. The programs for performing the sequence of steps shown in FIG. 15, such as video/audio-dedicated bus manager and the drivers, may be distributed in the form of a computer-readable recording medium such as a CD-ROM.

As has been described above, in the present invention, different video sources can be transferred directly to the display controller, respectively from a plurality of devices which process motion-picture data, without using the system bus. The various video sources can therefore be displayed with high efficiency. Further, hardware or software can achieve switching control so that only one device can use, at a time, the bus provided for transferring motion-picture data only, thus preventing data collision on the motion-picture bus. Still further, since the right to use the motion-picture bus is given to the last device in which an enable flat has been set, motion-picture data can always be transferred to the device which processes the very application the user wants to execute.

Industrial Applicability

The present invention can provide a computer system in which different video sources can be transferred directly to the display controller, respectively from a plurality of devices which process motion-picture data, thereby to display the various video sources with high efficiency, and can also provide a method of switching video sources in the computer system.

What is claimed is:

1. A computer system comprising:

a video port for receiving motion-picture data;

a display controller capable of displaying the motion-picture data input to the video port;

a motion-picture dedicated bus for transferring motion-picture data to a video port of the display controller; and a plurality of video devices for processing different motion-picture sources, respectively, each having an output port which is connected to said motion-picture dedicated bus and from which motion-picture data is output to said motion-picture dedicated bus, said motion-picture dedicated bus including a control signal line which is connected in common to said plurality of video devices which is set into an active state by the video device requesting for use of said motion-picture dedicated bus, each of said video devices comprising:

an output buffer for outputting motion-picture data from said output port to said motion-picture dedicated bus;

means for setting said signal control line in an active state for a predetermined time, in accordance with a motion-picture data transfer instruction issued from said CPU, and for allowing said output buffer to output the motion-picture data, after said predetermined time has elapsed; and means for monitoring the state of said control signal line and prohibiting said output buffer from outputting motion-picture data while said control signal remains active, whereby the video device set into an active state most recently is allowed to use the motion-picture data dedicated bus.

2. A computer system according to claim 1, further comprising means for monitoring the state of said control signal line and prohibiting said control signal line from being set into an active state until said control signal line is released from an active state, when said motion-picture data transfer instruction is issued while the control signal remains in an active state.

3. A computer system according to claim 1, wherein said output buffer comprises a three-state buffer which has a high-impedance state, and said means for allowing said output buffer to output motion-picture data comprises:

a register for holding enable information or disable information set by said CPU; and a combinatorial logic circuit for setting said control signal for a predetermined time in response to the enable information set by said CPU in said register, setting said output buffer in an enable state after said predetermined time has elapsed, monitoring the state of said control signal line, and maintaining said output buffer in a disable state while said control signal line remains in an active state.

4. A computer system according to claim 3, wherein said combinatorial logic circuit comprises:
a pulse generating circuit for generating a one-shot pulse signal in response to the enable information set by the CPU in said register;
a gate circuit for setting said control line in an active state and resetting said output buffer in response to an one-shot pulse signal output from said pulse generating circuit; and
a flip-flop circuit for setting said output buffer in an enable state in response to a signal output from said delay circuit, after a time corresponding to a width of the one-shot pulse signal has elapsed.

5. A computer system comprising:
a video port for receiving motion-picture data;
a display controller capable of displaying the motion-picture data input to the video port;
a motion-picture dedicated bus for transferring motion-picture data to the video port of the display controller; and
a plurality of motion-picture sources, each having an output port which is connected to said motion-picture dedicated bus and from which motion-picture data is output to said motion-picture dedicated bus,
said motion-picture dedicated bus including a control signal line which is connected in common to said plurality of motion-picture sources which is set into an active state by the motion-picture source requesting use of said motion-picture dedicated bus,
each of said motion-picture sources comprising:
an output buffer for outputting motion-picture data from said output port to said motion-picture dedicated bus;
means for setting said signal control line in an active state for a predetermined time, in accordance with a motion-picture data transfer instruction issued from said CPU, and for allowing said output buffer to output the motion-picture data, after said predetermined time has elapsed;
means for monitoring the state of said control signal line and prohibiting said control signal line from being set into an active state until said control signal line is released from an active state, when said motion-picture data transfer instruction is issued while the control signal remains in an active state; and
means for monitoring the state of said control signal line and prohibiting said output buffer from outputting motion-picture data while said control signal remains in an active state, whereby the motion-picture source to which a picture-image data transfer instruction is most recently issued from said CPU is allowed to use the motion-picture data dedicated bus.

6. A computer system comprising:
a video port for receiving motion-picture data;
a display controller capable of displaying the motion-picture data input to the video port;
a motion-picture dedicated bus for transferring motion-picture data to the video port of the display controller; and
a plurality of motion-picture sources, each having an output port which is connected to said motion-picture dedicated bus and from which motion-picture data is output to said motion-picture dedicated bus,
said motion-picture dedicated bus including a control signal line which is connected in common to said plurality of motion-picture sources which is set into an active state by the motion-picture source requesting for use of said motion-picture dedicated bus,
each of said motion-picture sources comprising:
an output buffer for outputting motion-picture data from said output port to said motion-picture dedicated bus;
means for setting said signal control line in an active state for a predetermined time, in accordance with a motion-picture data transfer instruction issued from said CPU, and for allowing said output buffer to output the motion-picture data, after said predetermined time has elapsed; and
means for monitoring the state of said control signal line and prohibiting said output buffer from outputting motion-picture data while the control signal remains in an active state, wherein the time for which said control signal line is set in an active state in accordance with an motion-picture transfer instruction supplied from said CPU is different for each motion-picture source, and the motion-picture source to which the longest time is assigned is allowed to use the motion-picture data dedicated bus before any other motion-picture source.

7. A computer system according to claim 6, wherein said means for allowing said output buffer to output motion-picture data comprises:
a programmable pulse generating circuit for setting different pulse widths for said motion-picture sources, respectively, in response to the enable information set by said CPU in said register;
a gate circuit for setting said control line in an active state and resetting said output buffer in response to a pulse signal output from said pulse generating circuit;
a programmable delay circuit for delaying a pulse signal output from said pulse generating circuit by different periods for said motion-picture sources, respectively; and
a flip-flop circuit for setting said output buffer in an enable state in response to a signal output from said delay circuit, after a time corresponding to a width of the pulse signal has elapsed.

8. A computer system comprising:
a video port for receiving motion-picture data;
a display controller capable of displaying the motion-picture data input to the video port;
a motion-picture dedicated bus for transferring motion-picture data to the video port of the display controller;
a plurality of motion-picture sources, each having an output port which is connected to said motion-picture dedicated bus and from which motion-picture data is output to said motion-picture dedicated bus; and
means for selecting one of the motion-picture sources, from which motion-picture data is to be transferred to the display controller by using said motion-picture dedicated bus, thereby selecting the video device which uses said motion-picture dedicated bus,
said selecting means comprising:
means for managing condition in which said motion-picture sources use said motion-picture dedicated bus;

means for identifying the motion-picture source now using the motion-picture dedicated line, in response to a request for use of said motion-picture dedicated bus, supplied from a driver program controlling the motion-picture source, and for communicating with the driver program controlling the motion-picture source, thereby determining whether the motion-picture source now using the motion-picture dedicated bus is able to release said motion-picture dedicated bus;

means for issuing a permission for use of said motion-picture dedicated bus to the driver program which has issued the request for said motion-picture dedicated bus, when the motion-picture source is able to release the motion-picture dedicated bus.

9. A computer system according to claim 8, wherein said means for managing condition in which said motion-picture sources use said motion-picture dedicated bus has a management table for managing the use condition of said motion-picture dedicated bus for each of said motion-picture sources, and refers to the management table, thereby to identify the motion-picture source now using said motion-picture dedicated bus.

10. A computer system according to claim 9, wherein when a PC card is connected to or disconnected while the computer system is operating, said management means is notified of the connection or disconnection of the PC card by a card service driver program, determines from attribute information of the card whether the card is able to use the motion-picture dedicated bus, and adds the device to or delete the device from the management table.

11. A method of switching video sources in a computer system comprising a video port for receiving motion-picture data, a display controller capable of displaying the motion-picture data input to the video port, a motion-picture dedicated bus for transferring motion-picture data to the video port of the display controller, and a plurality of motion-picture sources, each having an output port which is connected to said motion-picture dedicated bus and from which motion-picture data is output to said motion-picture dedicated bus, said method comprising the steps of:

managing condition in which said motion-picture sources use said motion-picture dedicated bus;

identifying the motion-picture source now using said motion-picture dedicated bus in response to a request for use of said motion-picture dedicated bus, supplied from a driver program controlling the motion-picture source, and communicating with the driver program to determine whether the motion-picture source using the motion-picture dedicated bus is able to release the motion-picture dedicated bus; and issuing a permission for use of said motion-picture dedicated bus to the driver program which has issued the request for said motion-picture dedicated bus, when the motion-picture source is able to release the motion-picture dedicated bus.

\* \* \* \* \*

UNITED STATES PATENT AND TRADEMARK OFFICE
CERTIFICATE OF CORRECTION

PATENT NO. : 6,297,794 B1
DATED : October 2, 2001
INVENTOR(S) : Takumi Tsubouchi et al.

It is certified that error appears in the above-identified patent and that said Letters Patent is hereby corrected as shown below:

<u>Column 14,</u>
Line 23, "a video" should read -- the video --.
Line 25, delete "video devices for processing different".
Line 26, delete "respectively"
Line 33, delete "video devices" and insert therefor -- motion picture sources --.
Line 34, delete "video device" and insert therefor -- motion picture sources --.
Line 36, delete "video devices" and insert therefor -- motion picture sources --.
Line 50, delete "video device" and insert therefor -- motion picture source --.

Signed and Sealed this

Twenty-fifth Day of June, 2002

Attest:

Attesting Officer

JAMES E. ROGAN
*Director of the United States Patent and Trademark Office*